Figure 1:
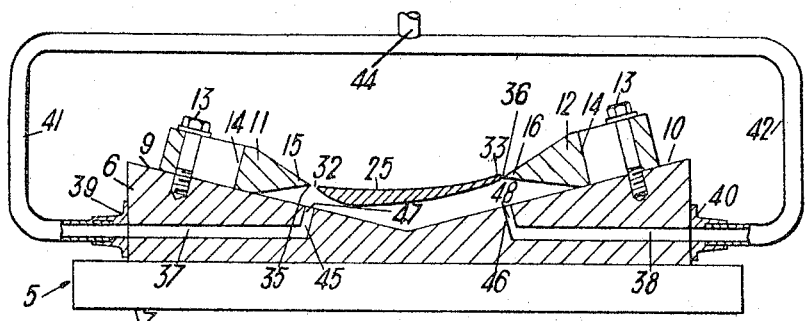

March 14, 1967　　　F. L. GOODWIN　　　3,309,294
ELECTROLYTIC SHAPING OF METALLIC AEROFOIL BLADES
Filed April 29, 1963

Inventor
Frederick Lewis Goodwin
By
Cushman, Darby & Cushman
Attorneys

United States Patent Office 3,309,294
Patented Mar. 14, 1967

3,309,294
ELECTROLYTIC SHAPING OF METALLIC
AEROFOIL BLADES
Frederick Lewis Goodwin, Derby, England, assignor to
Rolls-Royce Limited, Derbyshire, England, a company
of Great Britain
Filed Apr. 29, 1963, Ser. No. 276,541
Claims priority, application Great Britain, May 7, 1962,
17,560/62
4 Claims. (Cl. 204—143)

This invention relates to electrolytic shaping of metallic aerofoil blades, e.g., compressor blades for an axial flow compressor of a gas turbine jet propulsion engine.

A longitudinal edge of an aerofoil blade may be radiused by a hand polishing process after any "flashings" or rough projections on the edge have been removed by machining. The hand polishing process is difficult and requires considered skill, particularly where the blade has a cross section which varies along the length of the blade and/or where the blade is twisted about its longitudinal axis so that the longitudinal edge of the blade is obliquely inclined relatively to said longitudinal axis.

According to one aspect of the present invention, there is provided a method of manufacturing a metallic aerofoil blade including removing metal electrolytically from at least one longitudinal edge of the blade so as to radius that edge.

The blade is made of metallic material, i.e., material which is electrically conducting and which can be eroded electrolytically. Said at least one longitudinal edge of the blade may be the leading or trailing edge, although generally, both these edges will be radiused at the same time in accordance with the method of the invention. By radiusing said edge of the blade, we mean forming the edge so that in transverse cross section it appears as a circular or substantially circular arc which blends smoothly with both side walls of the blade.

Preferably, the method includes removing metal from said edge so as to form said edge as an elongated flat surface, prior to removing metal therefrom electrolytically. The elongated flat surface may be formed by a machining process, such as milling or grinding.

Preferably metal is removed electrolytically from said longitudinal edge by positioning an electrode with a working surface thereof facing said longitudinal edge and separated therefrom by a narrow gap, making the blade electrically positive relative to said electrode, and directing a flow of electrolyte through said gap.

The working surface of the electrode is preferably a knife edge, although alternatively the working surface may be non-pointed in transverse cross-section, e.g., flat, and may for example be concave.

Preferably the blade is initially formed as a forged blade blank.

According to another aspect of the invention, there is provided apparatus for electrolytically radiusing at least one longitudinal edge of a metallic aerofoil blade, comprising a support, at least one electrode carried by the support and having an elongate working surface, clamp means for supporting said blade with said at least one longitudinal edge thereof facing said working surface and separated therefrom by a narrow gap, and means for directing a flow of electrolyte through said gap, the blade in operation being made electrically positive relative to said electrode.

Preferably, the electrode is adjustably mounted on said support to permit said gap to be adjusted to a desired value.

The clamp means may be carried by the support, and may comprise an aligned pair of V-grooved carriers, each carrier having means for clamping a respective end of the blade in the V-groove thereof.

Preferably, said means for directing a flow of electrolyte through the gap comprises a passageway extending through the support and terminating in an outlet of elongate cross section, the electrolyte in operation being supplied to said passageway and being discharged from the support through said outlet in a jet which passes through the gap.

Figure 2:
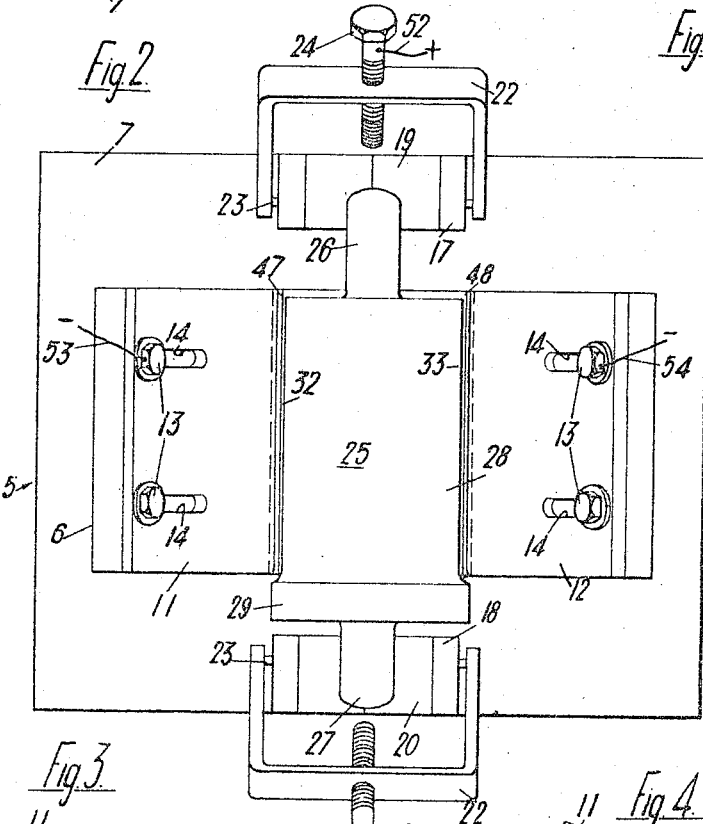
Figure 3:
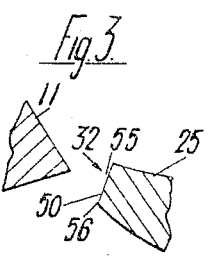
Figure 4:
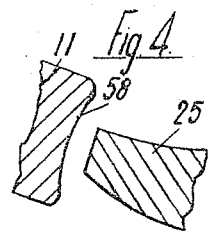

The invention will be further explained, by way of example, with reference to the accompanying diagrammatic drawings in which:

FIG. 1 is a transverse cross-sectional view of apparatus according to the invention, FIG. 2 is a plan view of FIG. 1 from which electrolyte supply piping has been omitted, and which shows clamping means for a blade, and FIGS. 3 and 4 are enlarged transverse cross sectional views showing one edge of a blade spaced by a gap from two different forms of electrode.

The apparatus shown in FIGS. 1 and 2 comprises a support 5 formed from a plate 6 mounted on a base member 7. The plate 6 has inwardly inclined surfaces 9, 10 on which electrodes 11, 12 are mounted by means of bolts 13 which extend through transverse slots 14 in the respective electrode and which are screwed into the plate 6. By loosening the bolts 13, the electrodes 11, 12 can be adjusted transversely of the plate 6 over a range limited by the length of the slots 14. Each electrode 11, 12 has a working surface in the form of a knife edge 15, 16.

As shown in FIG. 2, two V-grooved carriers 17, 18 are mounted on the base member 7 on opposite sides of the plate 6, so that the V-grooves 19, 20 thereof are aligned. Each carrier 17, 18 has a clamping means in the form of a bracket 22 pivotally connected thereto by a pivot 23, and a bolt 24 extends through the bracket in screw-threaded engagement therewith. A metal blade 25 provided with two stub end portions 26, 27, an aerofoil portion 28 and a platform 29, is supported by the carriers 17, 18 by placing the end portions 26, 27 in the grooves 19, 20. The blade is clamped in position by pivoting the brackets 22 and tightening the bolts 24 against the end portions so as to force them towards the apices of the grooves. The aerofoil portion 28 of the blade is of uniform transverse cross section throughout its length, and is not twisted about its longitudinal axis. As shown in FIG. 1, the blade is clamped in position so that its mean camber line at each longitudinal edge 32, 33 of the blade is aligned with the transverse centre line of the adjacent knife edge 11, 12. The edges 32, 33 are the leading and trailing edges respectively of the blade, and they are parallel to and spaced by a narrow gap 35, 36 from the apex of the adjacent knife edge.

Means for directing a flow of electrolyte through each gap 35, 36 comprises passageways 37, 38 formed in the plate 6, the passageways being connected by unions 39, 40 and pipes 41, 42 to a common electrolyte supply pipe 44. Each passageway has an upwardly extending end portion 45, 46 which terminates in an outlet 47, 48 of elongate cross section.

The blade 25 is first formed by a forging process which leaves a "flashing" or rough projection along each edge 32, 33. These flashings are removed by milling or grinding, and an elongate flat surface is formed at each edge (see 50 of FIG. 3). The blade is then clamped in the apparatus as described previously with reference to FIGS. 1 and 2, and a flow of electrolyte is pumped through the pipe 44 and is discharged from the outlets 47, 48 in jets which pass through the gaps 35, 36. The blade is then made electrically positive relative to each electrode 11, 12, the electrical connections being indicated diagrammatically at 52, 53 and 54. The corners (such as 55, 56 shown in FIG. 3) of the edges 32, 33 are then electrolytically eroded away, until a desired radius is formed on each edge.

Instead of an electrode having a working surface in the from of a knife edge, an electrode having a concave working surface such as shown at 58 in FIG. 4 can be used.

The initial width of the gaps 35, 36 can be of the order of a few thousandths of an inch, e.g., 0.003 to 0.005 inch. The electrolyte should flow through the gaps at a sufficiently high rate to sweep away the products of electrolysis so that they do not hinder the flow of electric current across the gap, and so that metal from the blade is not deposited on the electrodes. A suitable electrolyte flow rate is best determined by experiment for any given composition of electrolyte at any given temperature, and for a total gap cross sectional area of any given size. In one experiment conducted on a compressor blade of a gas turbine engine, an electrolyte flow rate of three to seven gallons per minute was used, which gives an indication of the electrolyte pumping capacity which might be needed. One form of electrolyte which has been used was an aqueous solution containing 12% by weight of sodium, sulphate, and 5% by weight of borax as a buffering agent.

The voltage across the gap is preferably low, e.g., 6 to 15 volts, and high current densities of the order of 200 amps per square inch of elongate flat surface at the edges, 32, 33 are preferably used. Radii of up to 0.15 in. have been produced satisfactorily in periods of the order of 10 minutes following the procedure described above.

Comparing the leading and trailing edges of the blade, since the leading edge is thicker and requires the greater radius, more material has to be removed from the leading edge than the trailing edge. Thus if the gap widths and gap voltages are equal, generally the radiusing of the trailing edge will be completed before that of the leading edge. The voltage between the blade 25 and the electrode 12 can then be switched off, while electrolytic erosion of the leading edge continues. Alternatively any suitable procedure can be adapted to ensure that the radiusing of the leading and trailing edges is completed in the same time interval. For example, use could be made of different gap widths and/or voltages, or electrodes having working surfaces of different shapes, or two electrolytes of different electrical conductivity.

It will be appreciated that many modifications and variations may be made to the method and apparatus which have been described without departing from the scope of the invention. Thus for example where the blade cross section varies along the length of the blade, and/or where the blade is twisted about its longitudinal axis, other forms of electrode for each longitudinal edge of the blade may be used, which may require to be adjustably mounted on the support of the apparatus to permit not only relative transverse movement of the electrode on the support, but also relative upward movement. Furthermore, a different form of clamping means for the blade may be used.

I claim:
1. A method of manufacturing a metallic aerofoil blade having a longitudinal edge, comprising the steps of: removing metal from said edge by a machining process so that it has an elongate flat surface substantially perpendicular to the mean camber line of said blade; clamping the machined blade blank with said elongate flat surface extending parallel to an elongate electrode and spaced therefrom by a narrow gap; placing said blank and said electrode at substantially different electrical potentials; directing electrolyte through said gap; and removing metal electrolytically from said elongate flat surface so as to radius it by passing current between said blade blank and the electrode.

2. A method as claimed in claim 1 in which said working surface of the electrode is a knife edge.

3. A method as claimed in claim 1 in which said working surface is concave in transverse cross section.

4. A method as in claim 1 wherein said electrolyte is directed through said gap from a passageway extending through a support for said blank in said elongate electrode and terminating adjacent said working surface in an outlet of elongate cross section, said method including the step of supplying a flow of electrolyte to said passageway.

References Cited by the Examiner

UNITED STATES PATENTS

| | | | |
|---|---|---|---|
| 2,844,531 | 7/1958 | Prince | 204—143 |
| 2,974,097 | 3/1961 | Ramirez et al. | 204—206 |
| 2,995,502 | 8/1961 | Ramirez et al. | 204—15 |
| 3,058,895 | 10/1962 | Williams | 204—143 |
| 3,095,364 | 6/1963 | Faust et al. | 204—143 |

FOREIGN PATENTS 703,838   2/1954   Great Britain.

HOWARD S. WILLIAMS, *Primary Examiner.*

JOHN H. MACK, R. K. MIHALEK,
*Assistant Examiners.*